(12) United States Patent
Fernándezlozano et al.

(10) Patent No.: US 8,859,002 B2
(45) Date of Patent: Oct. 14, 2014

(54) METHOD FOR THE DRY DISPERSION OF NANOPARTICLES AND THE PRODUCTION OF HIERARCHICAL STRUCTURES AND COATINGS

(75) Inventors: José Francisco Fernándezlozano, Madrid (ES); Israel Lorite Villalba, Madrid (ES); Fernando Rubio Marcos, Madrid (ES); Juan José Romero Fanego, Madrid (ES); Miguel Ángel García García-Tuñon, Madrid (ES); Adrian Quesada Michelena, Madrid (ES); Maria Soledad Martin González, Madrid (ES); José Luis Costa Kramer, Madrid (ES)

(73) Assignee: Consejo Superior De Investigaciones Cientificas, Madrid (ES)

( * ) Notice: Subject to any disclaimer, the term of this patent is extended or adjusted under 35 U.S.C. 154(b) by 699 days.

(21) Appl. No.: 13/055,166

(22) PCT Filed: Jul. 21, 2009

(86) PCT No.: PCT/ES2009/070299
§ 371 (c)(1),
(2), (4) Date: Apr. 15, 2011

(87) PCT Pub. No.: WO2010/010220
PCT Pub. Date: Jan. 28, 2010

(65) Prior Publication Data
US 2012/0107405 A1 May 3, 2012

(30) Foreign Application Priority Data
Jul. 22, 2008 (ES) ................... 200802177

(51) Int. Cl.
| | | |
|---|---|---|
| A61K 9/14 | (2006.01) | |
| B01J 13/00 | (2006.01) | |
| B01J 35/02 | (2006.01) | |
| C08L 77/00 | (2006.01) | |
| C09C 1/40 | (2006.01) | |
| C04B 35/628 | (2006.01) | |
| B82Y 30/00 | (2011.01) | |
| C09C 3/04 | (2006.01) | |
| C09C 3/06 | (2006.01) | |
| B01J 35/00 | (2006.01) | |
| B01J 23/80 | (2006.01) | |
| B01J 37/04 | (2006.01) | |
| B01F 13/00 | (2006.01) | |
| B01J 23/74 | (2006.01) | |

(52) U.S. Cl.
CPC ... C04B 35/62826 (2013.01); *C09C 1/407* (2013.01); *B01J 35/0013* (2013.01); *C04B 2235/3284* (2013.01); C04B 35/62892 (2013.01); *C04B 2235/3217* (2013.01); *C01P 2004/64* (2013.01); *B01J 23/80* (2013.01); *C01P 2002/82* (2013.01); C04B 35/62889 (2013.01); *B01J 37/04* (2013.01); *B82Y 30/00* (2013.01); *C09C 3/04* (2013.01); *B01F 13/0052* (2013.01); *C09C 3/063* (2013.01); *B01J 23/74* (2013.01); *Y10S 977/773* (2013.01); *Y10S 977/902* (2013.01); *Y10S 977/906* (2013.01)
USPC ........... 424/490; 424/400; 424/489; 977/773; 977/902; 977/906

(58) Field of Classification Search
CPC .. B82Y 30/00; C04B 35/62826; C09C 1/407; C09C 3/04; B01J 37/04; C01P 2002/82
USPC .................................................. 424/490, 400
See application file for complete search history.

(56) References Cited

U.S. PATENT DOCUMENTS

| | | | |
|---|---|---|---|
| 2003/0211416 A1 | 11/2003 | Proper et al. | |
| 2004/0018109 A1 | 1/2004 | Blatter et al. | |
| 2006/0046480 A1* | 3/2006 | Guo | 438/685 |
| 2008/0248306 A1* | 10/2008 | Spillmann et al. | 428/403 |
| 2010/0203144 A1* | 8/2010 | Laurencin et al. | 424/489 |

FOREIGN PATENT DOCUMENTS

| | | |
|---|---|---|
| EP | 0123041 | 10/1984 |
| EP | 1293248 | 3/2003 |
| EP | 1637216 | 3/2006 |
| WO | 2004074574 | 9/2004 |
| WO | 2006084413 | 8/2006 |
| WO | 2006106521 | 10/2006 |
| WO | WO 2007/036060 A1 * | 4/2007 |
| WO | 2007112805 | 10/2007 |
| WO | 2008013785 | 1/2008 |

OTHER PUBLICATIONS

"Alumina (chemical compound)". Encyclopaedia Britannica. Encyclopaedia Britannica Online, accessed on Sep. 30, 2013 at http://www.britannica.com/EBchecked/topic/17897/alumina.*
Sep. 30, 2013 Chemical Abstracts, Registry database, search results for "alumina oxide" and alumina.*
International Search Report dated Nov. 17, 2009 in re PCT/ES2009/070299 filed on Jul. 21, 2009.
Lorite, I. et al. "Electrostatic charge dependence on surface hydroxylation for different Al2O3 powders," Ceramics International 38 (2012) 1427-1434.
Bailey, "Electrostatic Phenomena During Power Handling", Powder Technology, 1984, vol. 37, pp. 71-85, Elsevier Sequoia, The Netherlands.

(Continued)

*Primary Examiner* — Mina Haghighatian
(74) *Attorney, Agent, or Firm* — Gardner Groff Greenwald & Villanueva, P.C.

(57) ABSTRACT

The invention relates to a method for the dispersion of synthetic or natural nanoparticles and nanocomposite materials and to the use thereof in different sectors including those of ceramics, coatings, polymers, construction, paints, catalysis, pharmaceuticals and powdered materials in general.

23 Claims, 12 Drawing Sheets

(56) References Cited

OTHER PUBLICATIONS

Urushihara et al, "Preparation of Modified Non-Agglomerated Dry Nanofillers Using Superficial Fluids", Journal of Chemical Engineering of Japan, 2007, vol. 40, No. 11, pp. 993-998, The Society of Chemical Engineers, Japan.

Martin-Gonzalez et al., "Insights into the room temperature magnetism of ZnO/Co3O4 mixtures", Journal of Applied Physics, 2008, vol. 103, pp. 083905 1-4, American Institute of Physics, United States.

Feng et al., "Relative Importance of Electrostatic Forces on Powder Particles", Powder Technology, 2003, vol. 135-136, pp. 65-75, Elseveir B.V., United States.

* cited by examiner

METHOD FOR THE DRY DISPERSION OF NANOPARTICLES AND THE PRODUCTION OF HIERARCHICAL STRUCTURES AND COATINGS

IN THE CROSS-REFERENCE TO RELATED APPLICATIONS

This application claims priority to Spanish Application No. P200802177, filed Jul. 22, 2008, which is hereby incorporated by reference in its entirety for all purposes.

The present invention relates to a process for the dispersion of synthetic or natural nanoparticles and nanocomposite materials and their applications in several sectors, most notably the sectors of ceramics, coatings, polymers, construction, paints, catalysis, pharmaceuticals and powdery materials in general.

STATE OF THE ART

The use of nanoparticles is growing dramatically in different industry areas. The unstoppable rise in applications in recent years is based on a growing availability of different types of nanoparticles of an oxidic or non-oxidic nature, with an organic or inorganic structure, and obtained in a synthetic or extractive way. Nanoparticles are usually used in combination with other compounds, whether nanoparticulate or not, and serve largely as a precursor of the so-called nanocomposites, which are composite-type materials in which one of the elements that comprises it has a nanoscale size, under 100 nm, in at least one of its dimensions. Materials with one dimension of a nanoscale range may have spherical, laminar or fibrillar morphology, among others. The addition of nanoparticles dispersed in materials matrixes generally introduces significant improvements in the properties of the nanocomposite material and, depending on its nature, can include various electrical, magnetic, optical, catalytic, etc. features. The high specific surface of the nanoparticles causes them to agglomerate, thus dramatically reducing their effectiveness and modifying their properties with regard to the dispersed state. The agglomeration degree is a factor, therefore, to be avoided in order to achieve the greatest effectiveness of the nanoparticles. Most of the different treatments used to achieve dispersion of the nanoparticles are based on the so-called wet-type processes with the presence of a solvent which, when removed, causes the occurrence of the re-agglomeration. In many cases, the solvents used are not environmentally friendly. A standard process consists of the dilution of the nanoparticles in a deagglomerating solvent by using mechanical, magnetic or ultrasonic means. A representative example of this type of process is to shake nanoparticles in a liquid medium together with other particles of a size between 200 and 1,000 greater than that of the nanoparticles so as to prevent the formation of agglomerates while introducing a low-pollution after removal of these particles [JP2005087972].

A more usual process consists of the addition of surfactants such as amphiphilic molecules in aqueous suspensions of nanoparticles in a way that favours the dispersion of the same in cosmetic, pharmaceutical, food, etc. applications [EP1293248, WO2006106521 or WO2008013785].

Another type of process that has recently begun to be used without using solvents are the so-called dry treatments. Examples of these processes are effective deagglomerations, such as: a) silica nanoparticles by using supercritical fluid techniques with carbon dioxide for modifying the surface of nanoparticles with different additives such as silane treatments, to obtain non-agglomerated nanoparticles [Li L., Urushihara Y., Matsui J., *J. Chem Eng Jap.* (2007) 40, 11, 993-998]; b) submicron particles, greater than 100 nm, deposited on larger organic particles produced by using high shear rotor using speeds greater than 50 ms$^{-1}$ [WO2007112805]; c) coatings of inorganic particles with organic particles that serve as a polymer matrix are achieved due to the effects of shear stress; and d) similar coatings of two or more components are produced using short intense thermal cycles to cause a fusion of polymer particles that serve as a matrix [US20040181 09].

One aspect common to different processes used for dry dispersion is the use of high-energy processes to achieve particle deagglomeration.

One field of application of dispersed nanoparticles is the formation of coatings in the form of thin films or thick films on specific substrates. In these processes, the dispersion of nanoparticles requires the use of solvents and surface-modifying agents. The use of inorganic nanoparticle dispersions with organic elements such as polymers or waxes enables, by applying electrostatic or magnetic fields, the formation of columnar structure coatings on substrates such as wood, textiles, plastics, paper, leather, glass, ceramics and metals [WO2006084413]. The use of nanoparticles based on talc, calcium carbonate, silica clay and plastic in a suspension can be used to form barrier coatings on cellulosic or inorganic material substrates [WO2004074574]. Nanoparticles with a modified surface by electric charges and further vacuum drying processing means that suspensions can be prepared in liquid medium which are deposited onto substrates electrically charged with opposite sign and thus form coatings with nanoparticle suspension. [JP2007016317].

From a general point of view, the processes used to date to disperse nanoparticles are based on changing the surface characteristics of nanoparticles to prevent these from agglomerating. The main forces that occur between particles are of a cohesive type (if it occurs between the particles of the same material) or adhesive type (if they exist between different materials or with a substrate). The major forces contributing to this type of particle interactions are electrostatic forces and van der Waals forces [Feng, J. Q., and Hays, D. A. *Powder Technology* (2003) 135-136, 65-75]. Electrostatic forces are related to the net electric charge at the surface of a particle, being higher for particles of insulating materials. For agglomerated particles, or nanoparticles, the electrostatic charge corresponds to the electric charge accumulated on the surface particles of the agglomerate. On the contrary, the forces holding the particles together in the agglomerates are of the van der Waals type. The origin of van der Waals forces lies in the molecular interactions due to polarization processes inherent in the material. The van der Waals forces are thus dominant when the distance between two particles is less than $10^{-9}$ m.

The experiments relating to this invention have their origin in the search of physical and chemical phenomena that give rise to a ferromagnetic type interface at room temperature in materials among submicron particles of ZnO and $Co_3O_4$ which possess diamagnetic and paramagnetic responses respectively at said temperature [Martín-González, M. S., Fernandez, J. F., Rubio-Marcos, F., Lorite, I., Costa-Kramer, J. L., Quesada, A., Bañares, M. A., Fierro, J. L. G., *Journal of Applied Physics* (2008), 103, 083905]. Dispersion among the particles was performed by attrition milling processes in an aqueous medium and the interaction between the two types of particles was determined by X-ray photoelectron spectroscopy and Raman spectroscopy. The interaction consisted of a surface reduction of cobalt particles, indicating the presence of an electrochemical reaction between the particles. The agglomerates of such particles present an accumulation of electrostatic charge of opposite sign and hence the attraction between these particles can be at the origin of this phenomenon.

BRIEF DESCRIPTION OF THE INVENTION

This invention proposes a low shear method for the dry dispersion of nanoparticles on other particles or substrates of varied morphology (circular, planar, in the form of thread) and nature (organic, inorganic and polymeric, etc.), which allows the production of a new class of materials in which particles are scattered over larger particles and even the formation of coatings on various substrates is achieved. This process is characterized by the absence of solvents during the same, i.e. it is a dry process that does not require high shear rates.

The dispersion of nanoparticles in a dry medium object of the present invention is based on altering the cohesive forces that hold together the particles of the same type by means of adhesive forces that occur between particles of a different nature or between particles and a substrate. The embodiment of the present invention requires the homogenization by appropriate means of a mixture of two materials where one material is nanoscale or at least one of its dimensions, that is, less than 100 nm. In this manner, a product is obtained consisting of a material with a particle distribution consisting of nanoparticles dispersed and anchored by short-range forces on nanoparticles or particles of different morphology or on substrates. Depending on the characteristics of nanocrystalline materials to be dispersed and of the support particles or substrate, and due to the nature of the forces used, dispersion is effectively produced for a given number of nanoparticles. Above the optimum rate of nanoparticles dispersed and in conjunction with them, clusters of nanoparticles mixed with support particles are also obtained. The products thus obtained are used as precursors for the production of nanostructured materials or nanocomposites wherein their processing is part of a dispersion of nanoparticles on the material that will serve as a matrix. A subsequent heat treatment permits either a partial reaction of the nanoparticles with the support or substrate anchoring them effectively, or a new compound consisting of a coating embedded in the support particle or substrate.

Therefore, a first aspect of the present invention relates to a method for dispersing nanoparticles, of one or more types, in which at least one type of nanoparticle has a size less than 100 nm in at least one of its dimensions, in other support particles or in a substrate. The process comprises the stirring of said nanoparticles along with other support particles or substrate, in a dry medium.

Throughout the description and claims, the word "comprises" and its variations are not intended to exclude other technical features, additives, components or steps. For those skilled in the art, other objects, advantages and characteristics of the invention will emerge in part from the description and in part from the practice of the invention.

To complement the description being made and in order to help better understand the characteristics of the invention, according to a detailed description thereof, a set of drawings is attached as an integral part of this description for illustrative purposes and without limiting the scope of the invention.

DETAILED DESCRIPTION OF THE INVENTION

Figure 1:
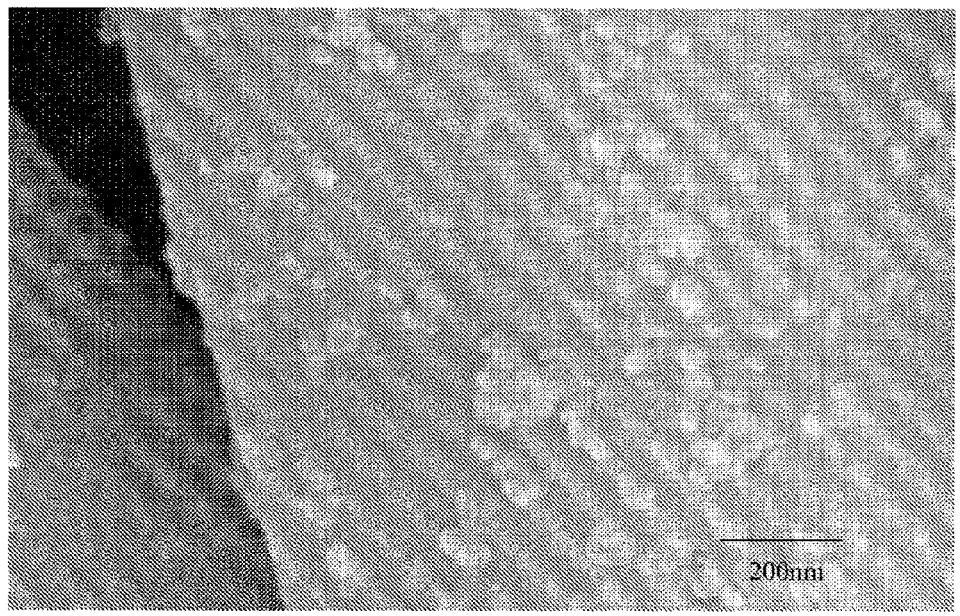
FIG. 1.—Represents micrographs of Field Emission Scanning Electron Microscopy showing $Co_3O_4$ nanoparticles dispersed on $Al_2O_3$ support particles.

The interaction forces between particles are of an adhesive and cohesive type such as electrostatic forces and van der Waals forces. The electrostatic forces in particles come from a net charge or excessive charge on the particle. The particles can acquire the charge in different ways such as coming into contact with other materials, by corona ions or induction in an external electric field. These are forces that prevail in dielectric materials or poor conductors. Particles or clusters of particles in presenting an electrostatic charge of the same nature tend to repel each other while particles of different charges have an attractive force. Charged dielectric particles adhere to metal if their resistivity is high [Bailey A. G., *Powder Technology* (1984), 37, 71-85] whereby their surface is modified generally with organic compounds, for dry paint applications. The electrostatic charge is highly dependent on external conditions and in particular the presence of moisture reduces the presence of said charge.

The origin of van der Waals forces is a molecular interaction due to different polarization mechanisms. The polarization of atoms and molecules is inherent to all materials and is less dependent on external conditions. Because they are short-range interactions, the magnitude of the van der Waals forces is particularly sensitive to the microscopic structure of the surface. Regarding nanoparticles or particles with at least one dimension in the nanoscale range, the surface is an important part of all involved atoms, thus polarization phenomena on the surface are predominant. Thus the van der Waals forces holding the two nanoparticles together are symmetrical, while the van der Waals forces between two different nanoparticles or between a nanoparticle and a sub-micron or micrometric particle, or between a nanoparticle and a substrate, are not. This invention uses these principles for effective dispersion of nanoparticles and particles in which at least one dimension is in nanoscale range, i.e. less than 100 nm.

Therefore, a first aspect of the present invention refers to a method for dispersing nanoparticles, of the same or different morphology and/or nature, wherein at least one of these types of nanoparticles is characterized in that its size is smaller than 100 nm, at least in one of its dimension. Preferably less than 75 nm, and more preferably between 1 and 50 nm. The dispersion is carried out on other support particles or on a substrate and comprises its shaking in a dry medium. Preferably the nanoparticles are added for dispersion in a proportion lower than 5% by weight relative to the support particles. More preferably in a proportion lower than 3% by weight relative to the support particles and even more preferably between 0.03 and 2% by weight relative to the support particles. When using a substrate, the dispersion of the aforementioned nanoparticles is characterized by the thickness of the nanoparticle coating on the substrate and this coating preferably being below 100 nm and even more preferably below 50 nm.

The nanoparticles to be dispersed may present a different morphology to the spherical one, such as laminar or fibrillar morphology, its fundamental characteristic being that at least one dimension is nanoscale, and particularly below 100 nm.

In a preferred embodiment, the nanoparticles or support particles are independently selected from the list comprising inorganic materials such as metal oxides, hydroxides, carbonates, sulphates, phosphates, silicates, borates, aluminates, etc., organic materials such as thermostable or thermo-melted polymers or resins, etc., or materials made of metal. More preferably the nanoparticles are one or more silicates such as sepiolite, or one or more metal oxides, preferably selected from the list comprising oxides of aluminium, cobalt, copper, tin, nickel, silicon, titanium or zinc. As an example, but not limited thereto, $Al_2O_3$, $Co_3O_4$, $CuO$, $NiO$, $SiO_2$, $SnO_2$, $TiO_2$, $ZnO$, etc.

As described above, these nanoparticles can be dispersed singly or in combination with other particles of the same or different nature and of the same size or not. The key feature of these combinations is that at least one of these types of nanoparticles is smaller than 100 nm in size, in at least one of its dimensions.

Figure 2:
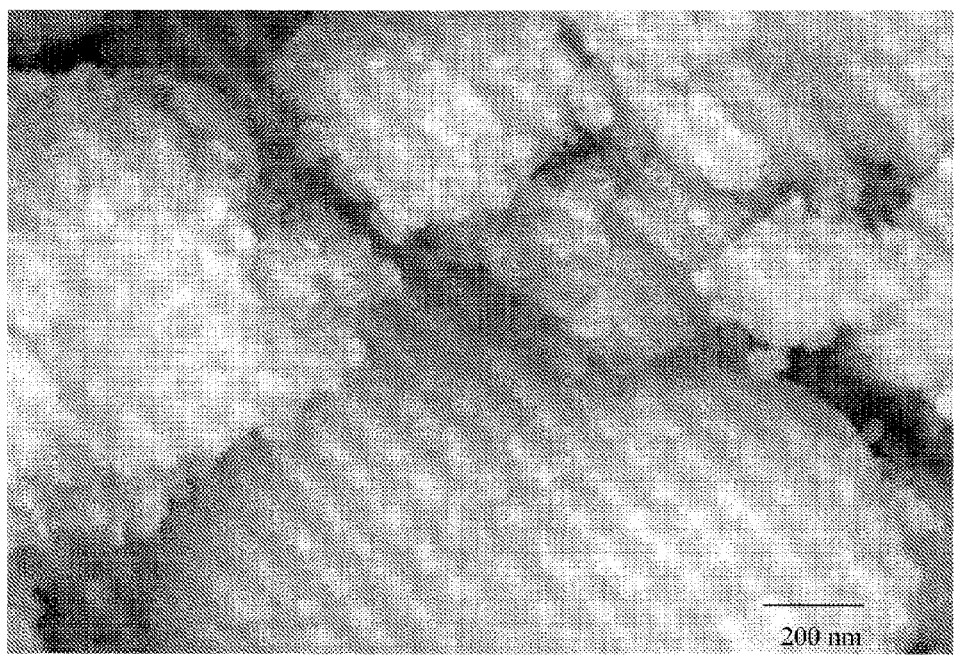
FIG. 2.—Represents micrographs of Field Emission Scanning Electron Microscopy showing $Co_3O_4$ nanoparticles dispersed on support particles of ZnO.
Figure 3A:
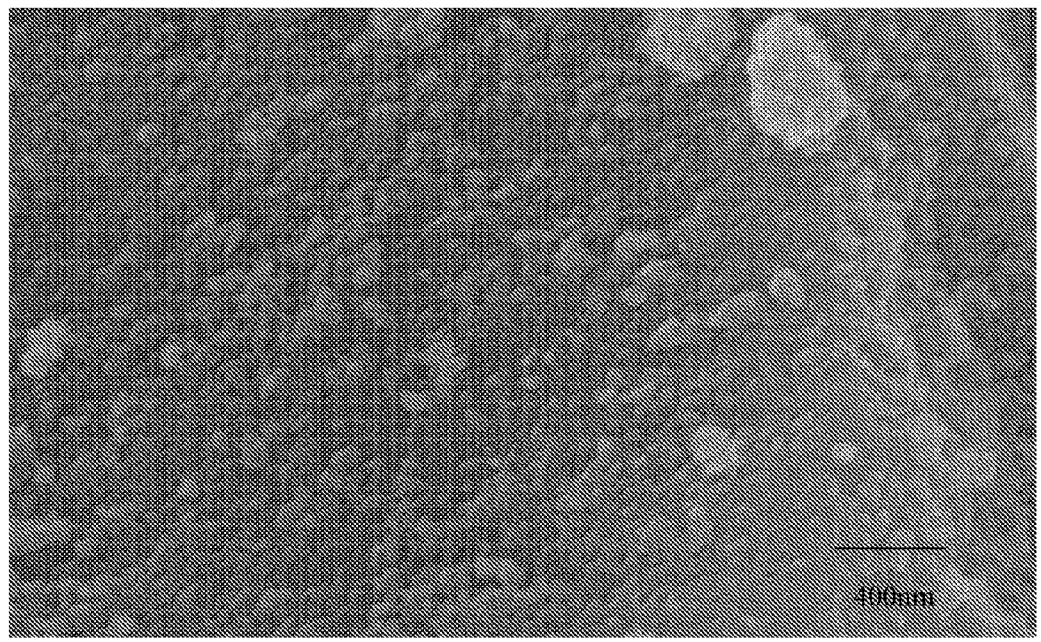
FIG. 3.—Represents micrographs of Field Emission Scanning Electron Microscopy, showing a) NiO nanoparticles dispersed on support $Al_2O_3$ particles, b) $SiO_2$ nanoparticles dispersed on a polyamide support particle, c) sepiolite type fibrillar clay fibres with a diameter below 50 nm dispersed on polyamide support particles.
Figure 3B:
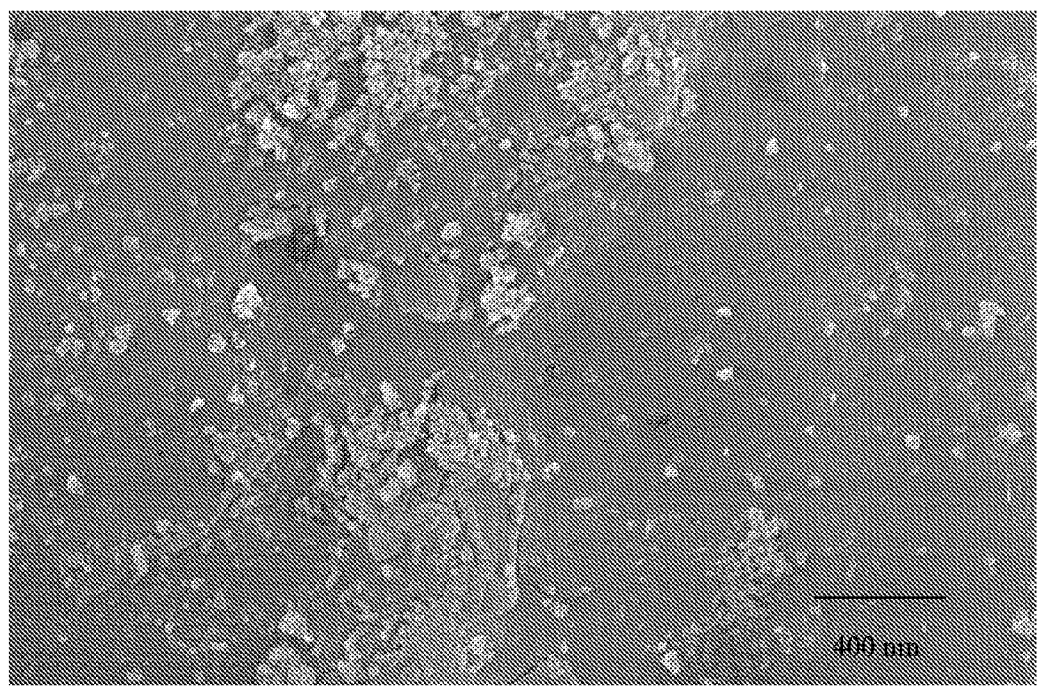
Figure 3C:
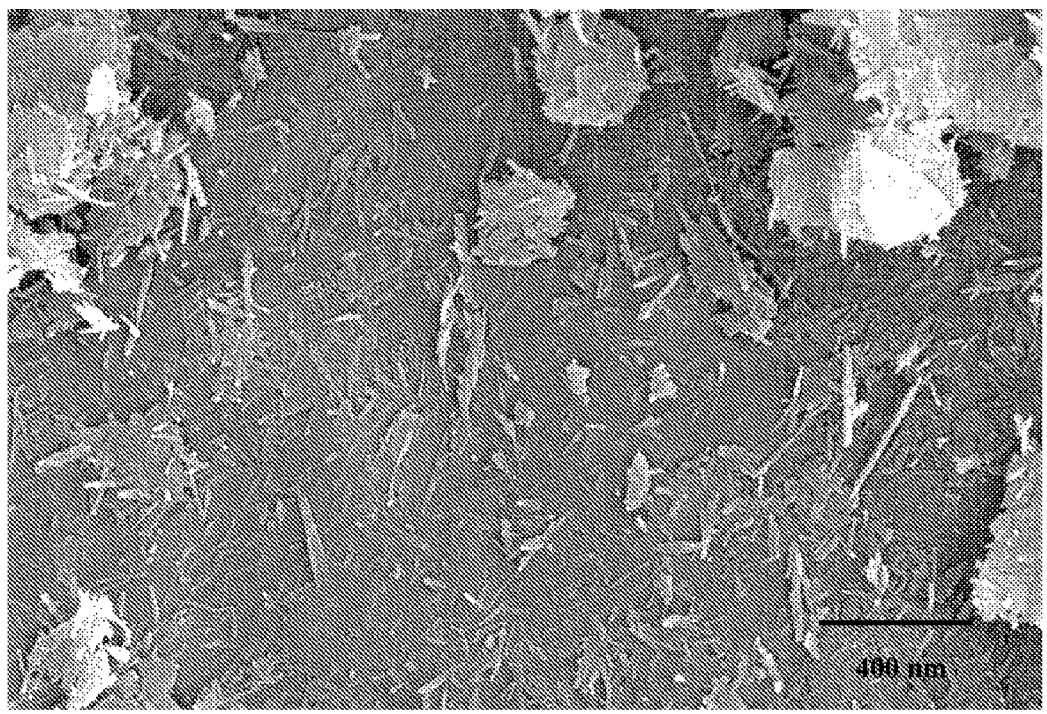

Regarding the support particles, they are defined as particles that are superior to the nano range and serve to disperse the nanoparticles described above or combinations thereof. These are preferably metal oxides such as, but not limited thereto, oxides of aluminium, nickel or zinc. More preferably $Al_2O_3$, $NiO$ or $ZnO$ (See FIG. 2).

The process of mixing nanoparticles and support particles is performed for example, but not limited thereto, in a Turbula type low speed stirring mixer. The mixer is partially charged with particles and nanoparticles to be dispersed so as to promote during homogenization collisions between clusters of different powder materials used. Particles and nanoparticles are previously dried in an oven at 60° C. overnight, although the process is equally effective without a drying process or after a thermal process at temperatures without the formation of sintering necks between nanoparticles, such as but not limited to 400° C. 2 hours. Collisions between particles and clusters of nanoparticles generated even in low speed regimes result in the breaking of such clusters and, as a result, the nanoparticles are dispersed on the surface of the support particles giving rise to a new kind of material with a hierarchical structure in which the nanoparticles are supported on the outer surface of the support particles (see for example FIG. 1).

Figure 4:
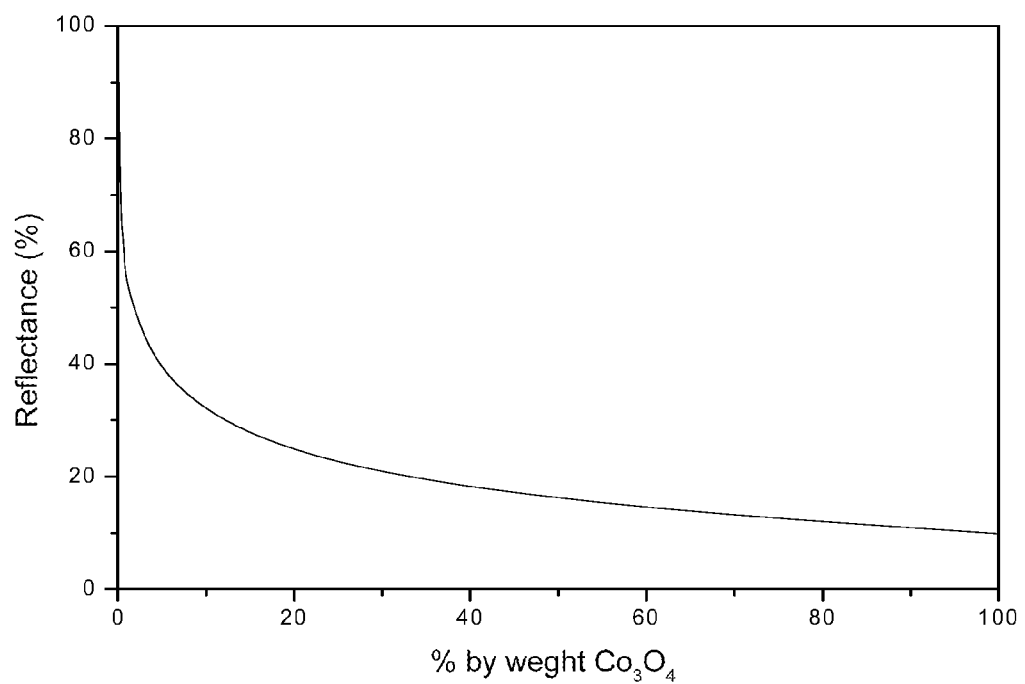
FIG. 4.—Shows the UV reflectance curve based on the weight percentage of $Co_3O_4$ nanoparticles dispersed on $Al_2O_3$ support particles of an average size of 6 µm. Nonlinearity is observed in the mixture characterized in a first phase for low contents in nanoparticles by a sharp decrease in UV reflectance related to an effective dispersion of nanoparticles and in a second phase for higher nanoparticle content in which nanoparticle clusters coexist along with the dispersed nanoparticles.
Figure 5:
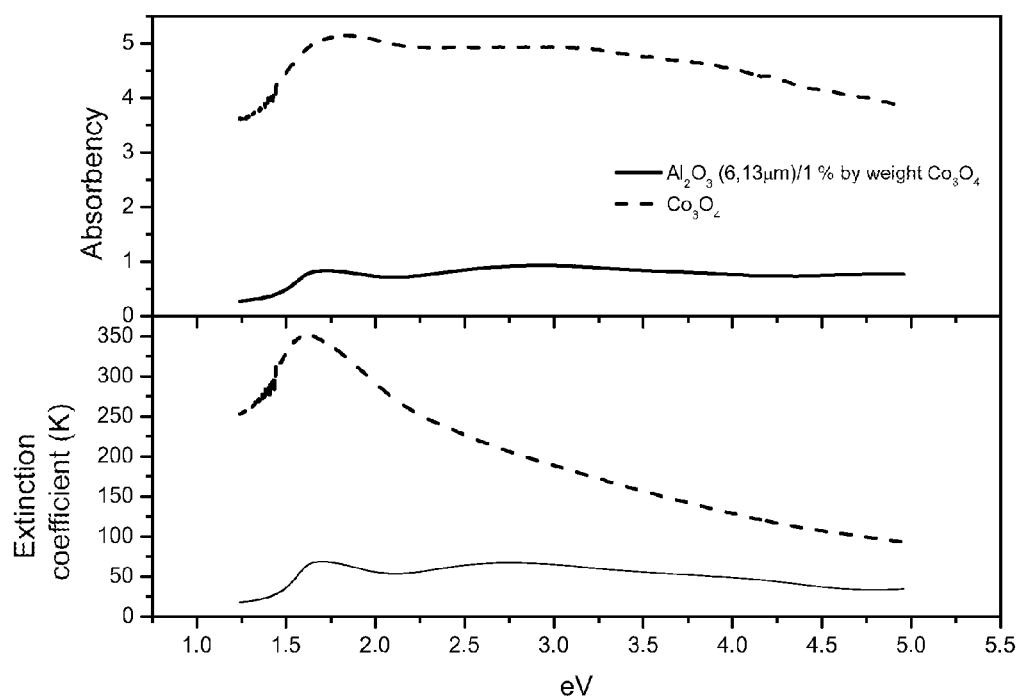
FIG. 5.—Shows a comparison of spectra of agglomerated $Co_3O_4$ nanoparticles and a hierarchical structure consisting of 1% by weight of $Co_3O$ nanoparticles dispersed on alumina support particles with an average size of 6 µm a) absorbance spectrum, A. and b) Extinction coefficient spectrum. Both spectra show a new level of energy in the range of 2.5-3 eV for the hierarchical structure.
Figure 6A:
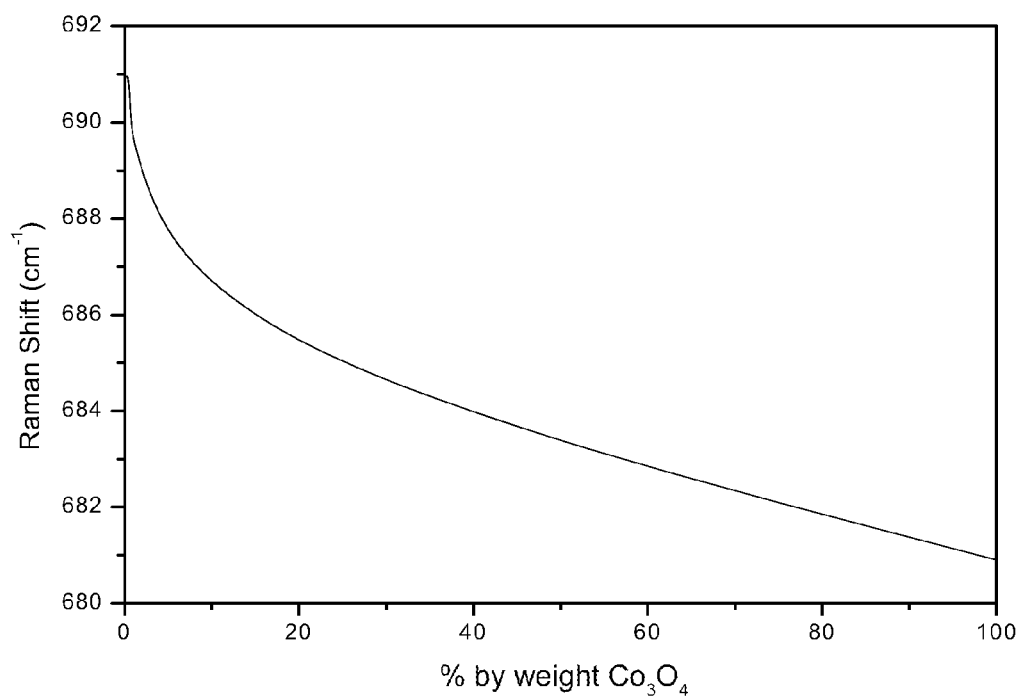
FIG. 6.—a) Shows the variation of Raman shift for the most intense peak of Raman spectra for $Co_3O_4$ depending on the percentage by weight of nanoparticles of $Co_3O_4$ dispersed on alumina support particles with an average size of 6 µm, b) Raman spectra corresponding to the most intense peak of $Co_3O_4$ for agglomerated $Co_3O_4$ nanoparticles and a hierarchical structure consisting of 1% by weight of $Co_3O_4$ nanoparticles dispersed on alumina support particles with an average size of 6 µm.
Figure 6B:
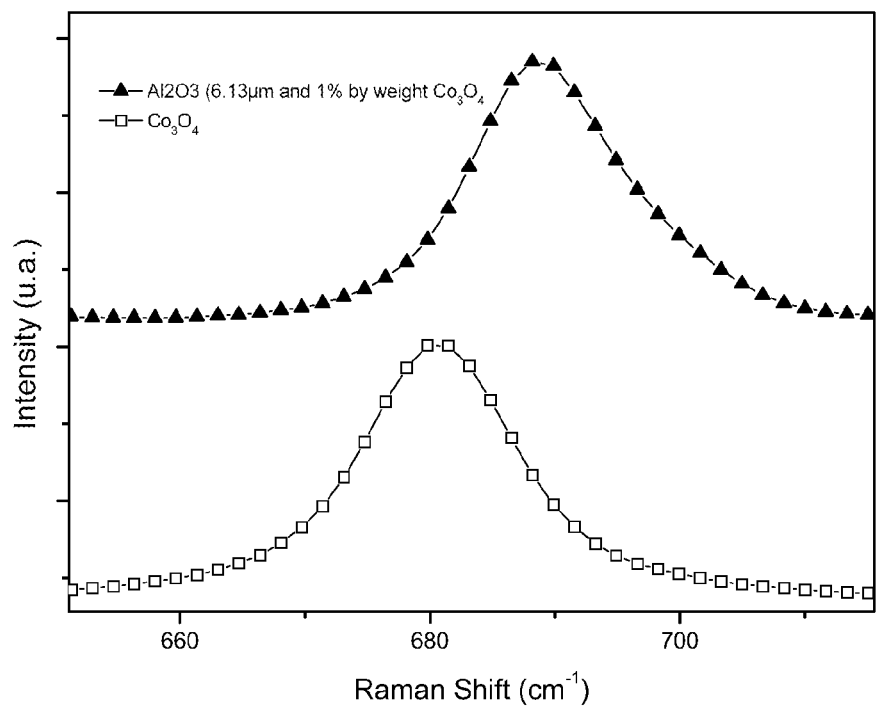

The percentage of nanoparticles that can be dispersed on a support particle has a limit that depends on the nature of both materials, surface characteristics, their morphology and their sizes. The mixtures resulting from said processes are characterized by an effective dispersion for a range or percentage of nanoparticles. FIG. 4. It being found that, for a superior range along with the dispersed nanoparticles, a ratio of non-dispersed nanoparticle clusters is obtained. The process can be characterized depending on the nature of the materials used as well as by showing interactions in the UV range, characteristics of the polarization processes that take place between particles and nanoparticles such as London forces by induced dipoles. See for example FIG. 5. Likewise, by modifying the crystalline lattice vibrations when the nanoparticles are dispersed. FIG. 6.

The dispersion process can be extended to more than one type of nanoparticle being able to combine several types of nanoparticles simultaneously or by developing a more complex hierarchical structure, such as by initially dispersing smaller nanoparticles on larger ones and in turn dispersing this grouping on a support particle. In any case, the dispersion of different nanoparticles is limited by the nature of the materials used, their surface characteristics, their morphologies and sizes.

A particular case of dispersion is one in which support particles are replaced by a substrate. Therefore, in another preferred embodiment, the nanoparticles, or combinations thereof, described above, are dispersed in a substrate instead of support particles. The substrate used in this process is selected from among a ceramic, glass, polymeric, metallic type material, or composite or hybrid materials. More preferably it is selected from the list comprising alumina, monocrystalline silicon, ceramic glaze, polyamide, polypropylene, a metal alloy such as kovar or any combination thereof.

A particular case is that the support particles or substrate may have a varied morphology (circular, planar, in the form of thread) and nature (organic, inorganic, polymeric, etc.).

Figure 7:
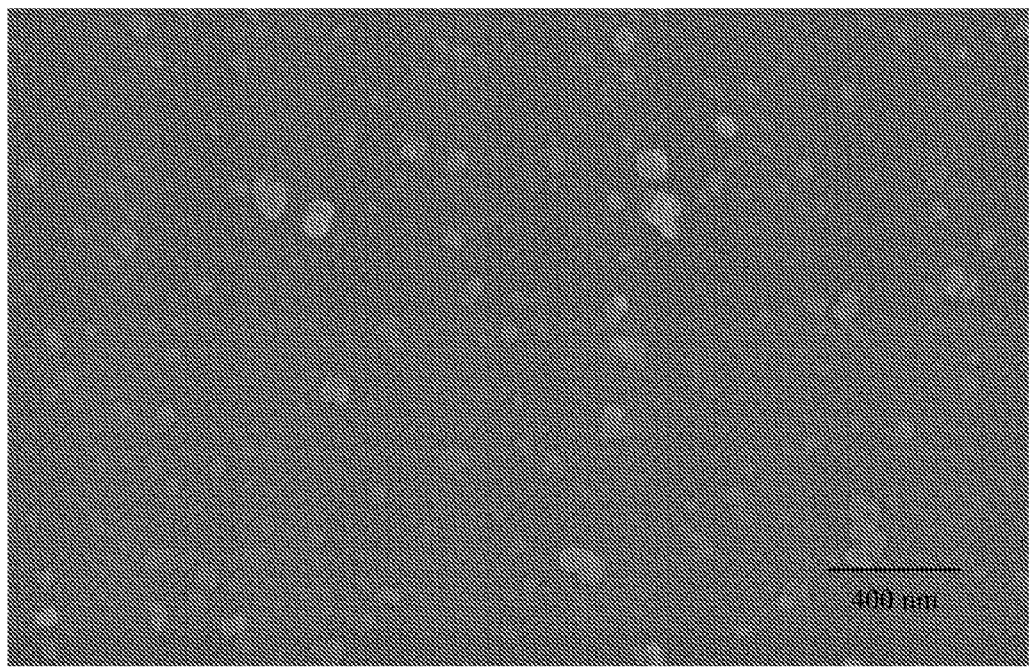
FIG. 7.—Shows micrographs of Field Emission Scanning Electron Microscopy showing $Co_3O_4$ nanoparticles dispersed on a $Al_2O_3$ substrate sintered and polished to a mirror.
Figure 8A:
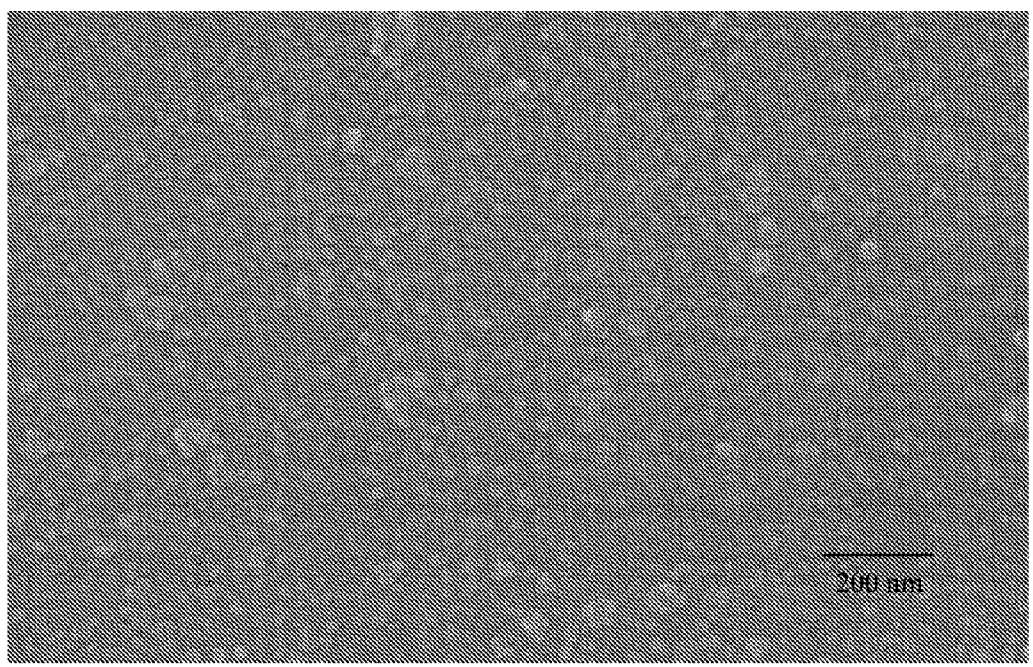
FIG. 8.—Shows micrographs of Field Emission Scanning Electron Microscopy, showing a) nanoparticles of NiO dispersed on a monocrystalline Si substrate, b) $Co_3O_4$ nanoparticles dispersed on a glassy substrate forming a crystalline glaze stoneware support porcelain, c) sepiolite type fibrillar clay fibres with a diameter below 50 nm functionalized with a hydrogenated tallow trimethyl type protonated quaternary amine, 3MTH, dispersed over a monocrystalline Si substrate, d) sepiolite type fibrillar clay fibres with a diameter less than 50 nm dispersed on a polypropylene substrate, and e) $Co_3O_4$ nanoparticles dispersed on a Kovar alloy metallic substrate.
Figure 8B:
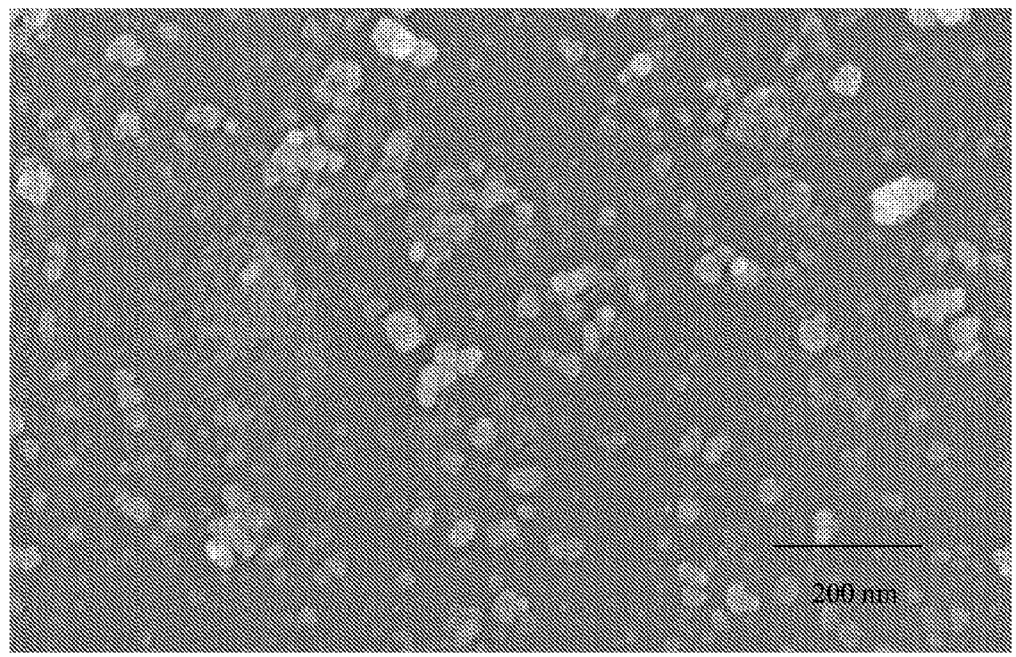
Figure 8C:
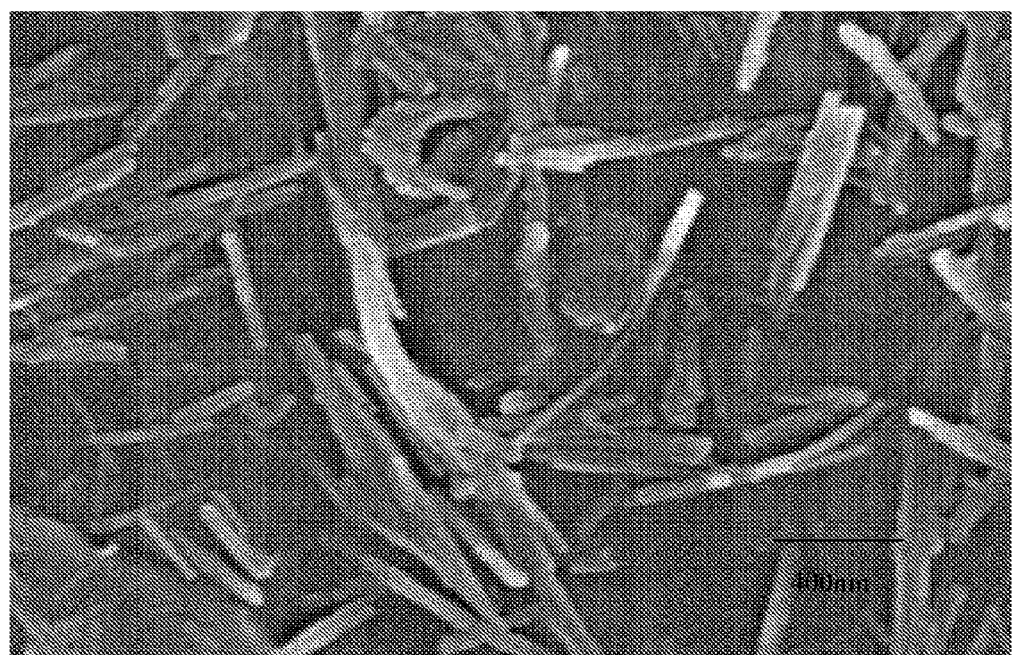
Figure 8D:
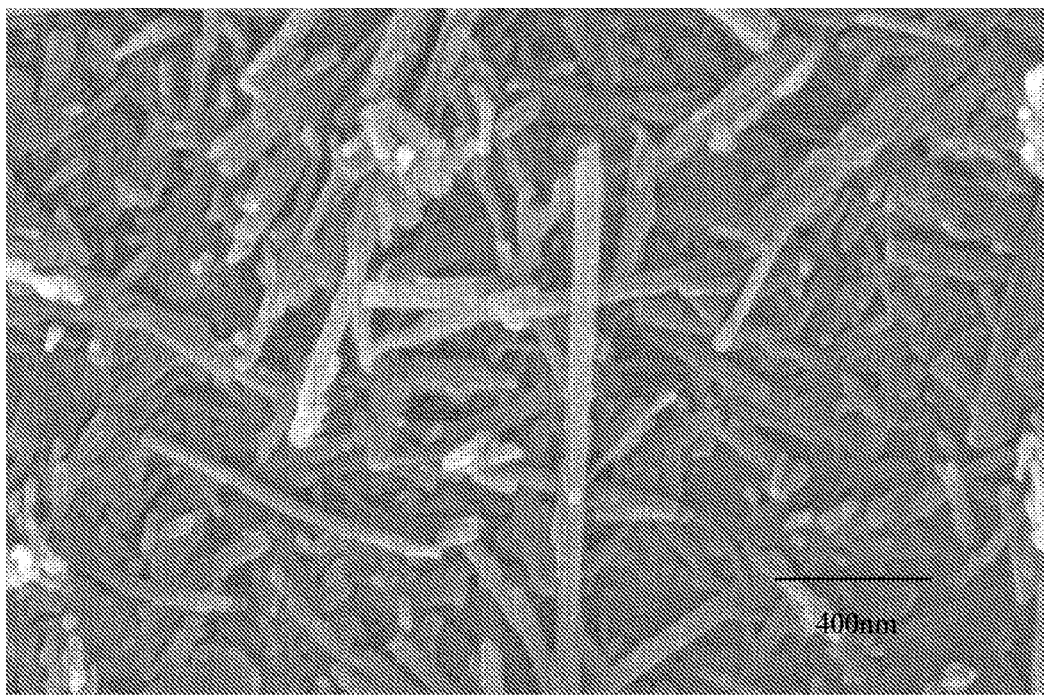
Figure 8E:
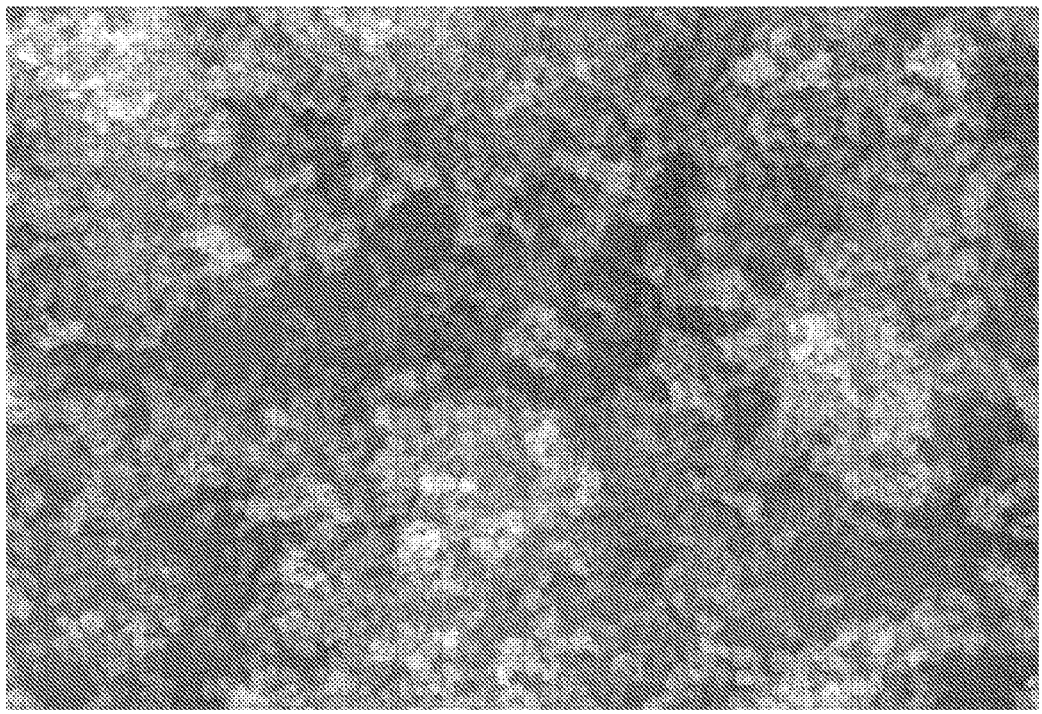

The dispersion occurs within a mixer where the substrate is located. After the characteristic stirring process of the shaker mixer, there is a deposition of nanoparticles on the substrate surface. The nanoparticles used are similar in type to those mentioned in the dispersion on support particles. The elimination by air pressure of excess nanoparticles deposited results in one or more layers of nanoparticles dispersed on the surface of the substrate with a thickness usually less than 100 nm (see FIG. 7).

Therefore, in a preferred embodiment, air pressure eliminates excess nanoparticles dispersed on the substrate.

Figure 9:
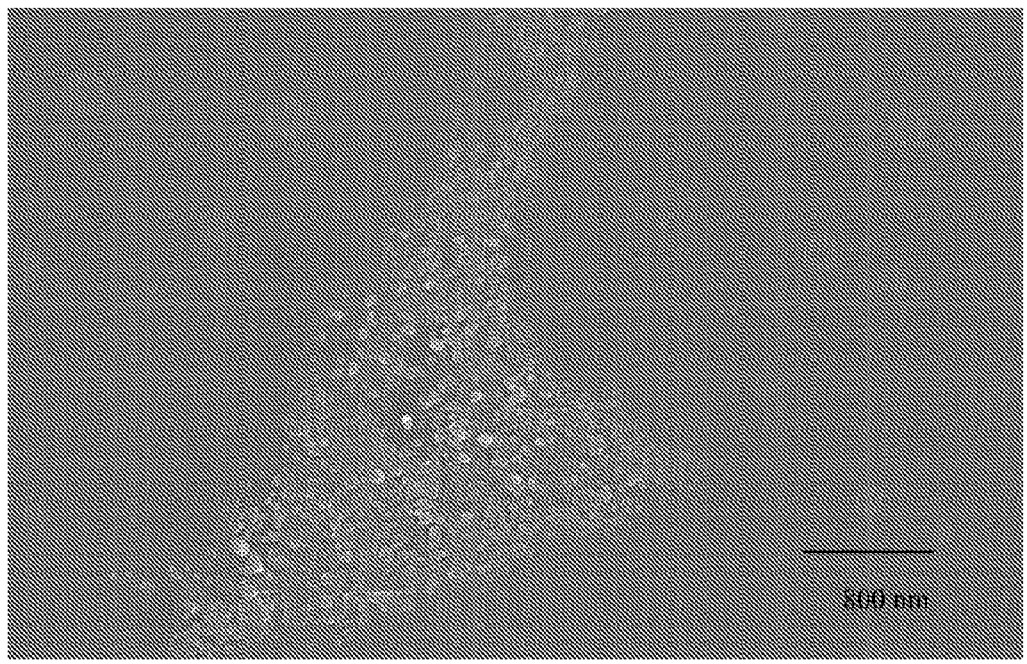
FIG. 9.—Shows micrographs of Field Emission Scanning Electron Microscopy showing a defect of the $Al_2O_3$ substrate sintered and polished to a mirror filled with $Co_3O_4$ nanoparticles after a dry grinding process of the dispersed layer of nanoparticles.

As described above, the types of materials used as substrates can be of different nature the same as the support particles; some examples are shown in FIG. 8. In the case of metallic substrates, it has been observed that the layers of dielectric nanoparticles deposited are of a greater thickness and may even be thicker than 100 nm due to the attractive force exerted by the substrate on such materials. When using substrates which have defects or pores, which can be deliberately induced or produced by different technologies, removal by dry soft polishing results in the elimination of nanoparticles dispersed while producing a filling of such defects with the nanoparticles (see for example FIG. 9).

The stirring in this process, both in the case of support particles and substrates, is carried out in a shaker mixer. The shaker mixer can be used with ceramic ball charge, such as alumina balls 2 mm in diameter, so as to facilitate the process. The Turbula type shaker mixer can be substituted with another type of mixer such as for example a V powder mixer, a drum mixer, a free drop mixer, a concrete mixer type, an Eirich type intensive mixer, or any mixer with features similar to those referred, regardless of the brand name.

In a preferred embodiment, the resulting dispersion of the process described is subjected to thermal treatment.

For all the above, one aspect of the present invention is directed to the dispersion of nanoparticles on support particles or substrate obtainable by the method described, as well as nanostructures with a hierarchical structure obtainable once the dispersions have undergone thermal treatment.

The processes described above lead to an effective dispersion of nanoparticles on support particles or substrates. These structures characterized by the processes described above can be used in a wide range of applications in different fields. Therefore, a final aspect of the present invention relates to the use of the dispersion of nanoparticles on support particles or substrate or of the nanostructures in different applications. A family of applications consists of those in which the support particle forms the final compound matrix, or at least a constituent of said matrix. The nanoparticles are added to the matrix in the process of shaping the material and the high degree of dispersion achieved promotes the dispersion of nanoparticles in the final nanocomposite. In those mixtures in which the percentage of nanoparticles is in excess of the effective dispersion limit, the existing agglomerated nanoparticles are added to the nanocomposite along with the dispersed nanoparticles. In the latter case, the fluidity of the mixture helps the handling, dosing and processing of nanoparticles that would otherwise be difficult. Another type of application is obtaining products through subsequent thermal treatments leading either to the anchoring of the nanoparticles by partial reaction at the interface or the formation of a nanoscale coating on the support particles or the substrate. The thermal process required will be determined by the corresponding equilibrium phase diagrams and kinetically activated by the high surface reactivity of the nanoparticles. These processes thus serve to obtain materials that are not possible by other techniques or require complex techniques to obtain them. Products obtained include hierarchical structures consisting of nanoparticles dispersed on the outside of support particles or substrates, anchored by an interface of a different chemical nature or by the formation of a new compound consisting of a coating embedded in the support particle or substrate, this coating being characterized in that it is of a nano type. These materials thus obtained can be used in new processes of forming composite and nanocomposite materials.

Therefore, the dispersions obtained can be used in various industry sectors such as ceramics, coatings, polymers, construction, paints, catalysts, pharmaceuticals and powdery materials in general.

Embodiments of the Invention

The following examples are provided by way of illustration and are not intended to limit the scope of the present invention.

EXAMPLE 1

A Method for Obtaining $Co_3O_4$ Nanoparticles Dispersed on $Al_2O_3$ Support Particles 5 g of $Al_2O_3$ particles with an average particle size of ~6 μm and 0.05 grams of $Co_3O_4$ nanoparticles with an average size below 50 nm were used. The two ceramic powders were added to a closed tubular nylon container, with a volume of 60 $cm^3$ of a Turbula type shaker mixer, occupying ¼ of the available volume. The container was stirred at a speed of 30 rpm for 5 minutes. The container was emptied and the resulting mixture showed an effective dispersion $Co_3O_4$ nanoparticles on the $Al_2O_3$ support particles, as shown in FIG. 1. By modifying the percentage of nanoparticles from 0.03% by weight to 5% by weight, an effective dispersion was obtained according to the reflectance curve in FIG. 4. For higher weight percentages of nanoparticles in the mix, non-dispersed agglomerates are obtained along with the dispersed nanoparticles.

EXAMPLE 2

Figure 10A:
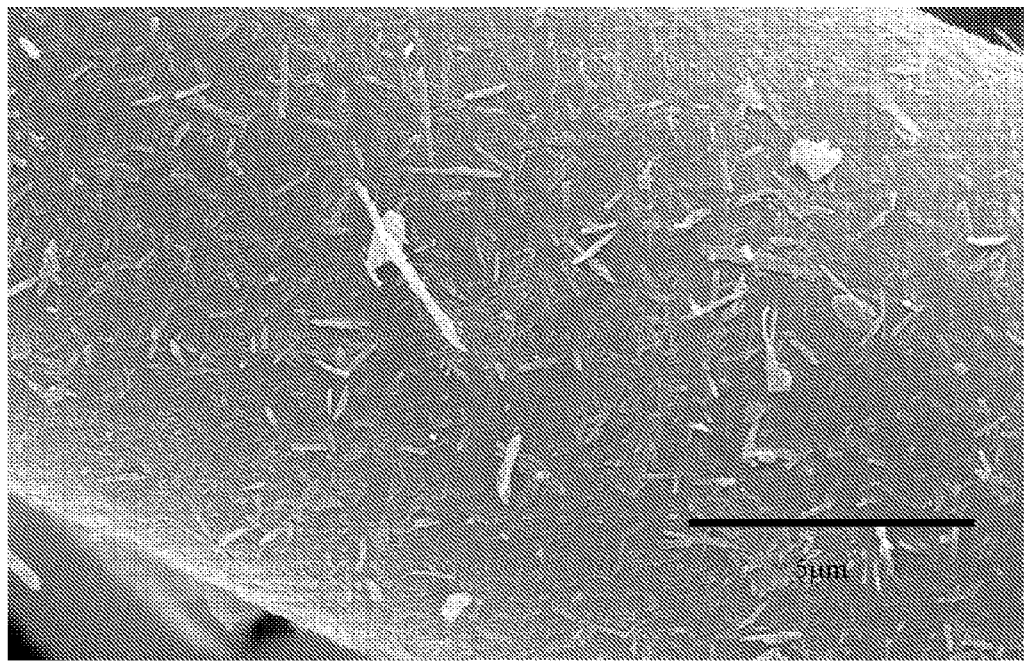
FIG. 10.—Represents micrographs of Field Emission Scanning Electron Microscopy showing sepiolite nanoparticles dispersed on a polymetric substrate in thread form, a) 0.2 mm glass fibre, b) 3 mm glass fibre.
Figure 10B:
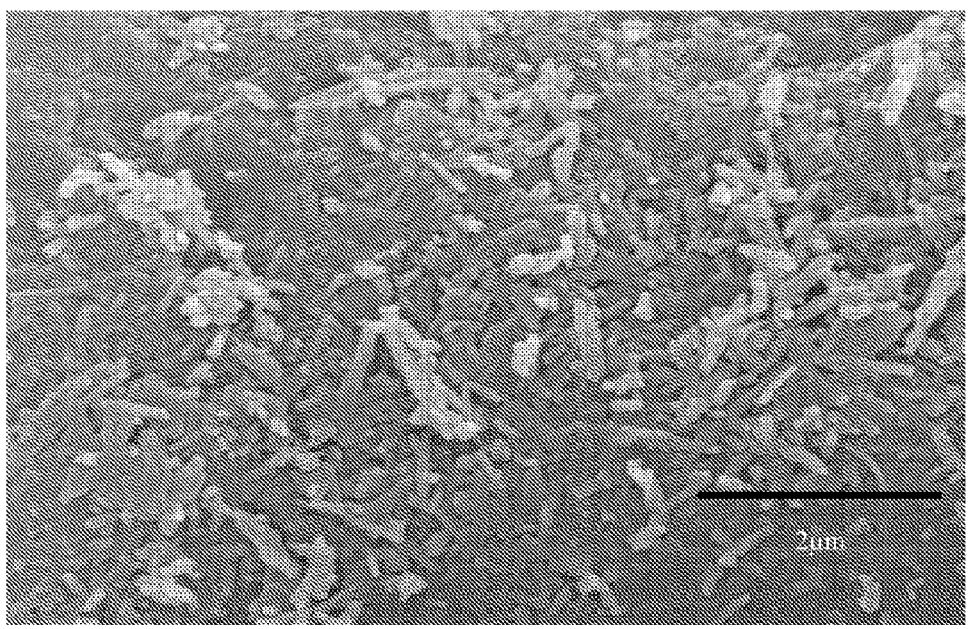

A Method for Obtaining Sepiolite Nanoparticles Dispersed on a Substrate of Glass Fibre in the Form of Thread 5 grams of fibre glass were used, having an average length of 3 mm and a diameter of 10 μm, and 5% by weight of sepiolite fibrillar particles with an average length of 1.5 μM and an average diameter of 40 nm. The two materials were added to a closed tubular nylon container, with a volume of 60 $cm^3$ of Turbula type shaker mixer. The container was stirred at a speed of 60 rpm for 10 minutes. The container was emptied and the resulting mixture showed an effective dispersion of sepiolite nanoparticles on glass fibre yarns as shown in FIG. 10.

EXAMPLE 3

A Method for Obtaining NiO Nanoparticles Dispersed on a Monocrystalline Si Substrate with Native Oxide Layer A flat monocrystalline Si substrate with a 2 $cm^2$ surface area was fixed by means of adhesive tape on the inside of the lid of the closed container used in the Turbula type shaker mixer. 1 gram of NiO nanoparticles smaller than 20 nm is introduced into the container. The mixture was stirred at a speed of 42 rpm for 3 minutes. Once the substrate had been removed, excess nanoparticles deposited on the surface were removed using a compressed air pistol at 4 bar pressure. The thickness of the layer of dispersed NiO nanoparticles was 30 nm determined by ellipsometry.

EXAMPLE 4

A Method for Obtaining Dispersion of Sepiolite-Type Fibrillar Clay Whose Fibre Diameter is below 50 nm on Polyamide Particles 1,000 grams of polyamide particles were used with a size of about −200 μm and irregular morphology along with 30 grams of sepiolite with an average length of 1.5 μm and an average diameter of 40 nm. Both materials were introduced into a stainless steel bowl of an Eirich type intensive laboratory mixer occupying about ⅓ of the actual volume. The mixer turned at a speed of 30 rpm with blades that rotate in opposite directions at 40 rpm. The mixing process was performed for 10 minutes. The resulting product consisted of sepiolite fibres dispersed on the surface of the polyamide particles.

EXAMPLE 5

A Method for Obtaining a Cobalt Spinel Coating on $Al_2O_3$ Support Particles 1 gram of ZnO particles was used with an average particle size of −400 nm and 3 grams of $Co_3O_4$ nanoparticles with an average size below 50 nm. Both ceramic powders were introduced in a closed tubular nylon container with a volume of 60 cm³ of a Turbula type shaker mixer, occupying ⅓ of the available volume. The container was stirred at a speed of 30 rpm for 5 minutes. The container was emptied and 0.25 grams of the resulting mixture were used along with 5 grams of $Al_2O_3$ particles with an average particle size of −6 μM. The new mixture was introduced in the container described above occupying ¼ of the available volume. The container was stirred at a speed of 60 rpm for 5 minutes.

The container was emptied and the resulting mixture placed in an alumina crucible of 99% underwent a thermal treatment at 1,000° C. for 2 hours using a heating rate of 5° C./min. and cooling according to the oven. The final product was characterized by a coating of alumina particles consisting of a spinel type crystal structure corresponding to a zinc and cobalt aluminate. The colour intensity determined by CieLab coordinates showed a difference in tone less than a 4-ΔE as regards to a commercial pigment. The pigment described in this example uses only 20% by weight of cobalt necessary to obtain the commercial pigment.

The invention claimed is:

1. A method for producing a nanostructure consisting of dry stirring in a dry medium (1) nanoparticles having a size less than 100 nm in at least one dimension selected from the group consisting of metal oxides, hydroxides, carbonates, sulfates, phosphates, silicates, borates, aluminates, thermostable polymers, thermo-melted polymers, polymer resins, and any combination thereof, and (2) support particles or a substrate, wherein the nanoparticles are dispersed on the support particles or the substrate and added for dispersion at a rate less than 5% by weight with respect to the support particles or substrate.

2. A method according to claim 1, wherein the excess of nanoparticles dispersed on the substrate is removed by air pressure resulting in a nanoparticle coating with a thickness of less than 100 nm.

3. A method according to claim 1, wherein the support particles are independently selected from the group consisting of inorganic materials, organic materials and metallic materials.

4. A method according to claim 1 wherein the nanoparticles are of the same or different nature and are selected from the group consisting of sepiolite, aluminum oxide, cobalt oxide, copper oxide, tin oxide, nickel oxide, silicon oxide, titanium oxide, zinc oxide, and any combination thereof.

5. A method according to claim 1, wherein the support particles are aluminium oxide or zinc oxide.

6. A method according to claim 1, wherein the substrate is selected from the group consisting of ceramic, glass, polymer and metal materials.

7. A method according to claim 1, wherein the substrate is selected from the group consisting of alumina, monocrystalline silicon, polyamide, and polypropylene.

8. A method according to claim 1, wherein the support particles or the substrates can be of a varied morphology.

9. A method according to claim 1, wherein the stirring is carried out in a shaker mixer.

10. A method according to claim 9, wherein the shaker mixer is a ball charged shaker, a turbula mixer, a V powder mixer, a drum mixer, a free drop mixer, a concrete mixer or an Eirich intensive mixer.

11. Nanostructures with hierarchical structure consisting essentially of dispersed nanoparticles having a size less than 100 nm in at least one dimension selected from the group consisting of metal oxides, hydroxides, carbonates, sulfates, phosphates, silicates, borates, aluminates, thermostable polymers, thermo-melted polymers, polymer resins, and any combination thereof, wherein the nanoparticles are anchored by short range forces on support particles or on a substrate and wherein the nanostructures are produced by the process consisting of dry stirring in a dry medium (1) said nanoparticles having a size less than 100 nm in at least one dimension and (2) support particles or a substrate, and wherein the nanoparticles are dispersed on the support particles or the substrate in a proportion lower than 5% by weight with respect to the support particles or substrate.

12. A material comprising the nanostructures according to claim 11, wherein the material is selected from the group consisting of composite materials, ceramics, polymers, paints, cements, catalysts and drugs.

13. The nanostructures according to claim 11, wherein the support particles are independently selected from the group consisting of inorganic materials, organic materials and metallic materials.

14. The nanostructures according to claim 11, wherein the nanoparticles are of the same or different nature and are selected from the group consisting of sepiolite, aluminum oxide, cobalt oxide, copper oxide, tin oxide, nickel oxide, silicon oxide, titanium oxide, zinc oxide, and any combination thereof.

15. The nanostructures according to claim 11, wherein the support particles are aluminum oxide or zinc oxide.

16. The nanostructures according to claim 11, wherein the substrate is selected from the group consisting of ceramic, glass, polymer and metal materials.

17. The nanostructures according to claim 11, wherein the substrate is selected from the group consisting of alumina, monocrystalline silicon, polyamide, and polypropylene.

18. The nanostructures according to claim 11, wherein the support particles or the substrate can be of a varied morphology.

19. The nanostructures according to claim 11, wherein the stirring is carried out in a shaker mixer.

20. The nanostructures according to claim 19, wherein the shaker mixer is a ball charged shaker, a turbula mixer, a V powder mixer, a drum mixer, a free drop mixer, a concrete mixer or an Eirich intensive mixer.

21. The nanostructure according to claim 11, wherein the dry stirring is carried out at a speed selected from the group consisting of 30, 40, 42 and 60 rpm.

22. The nanostructure according to claim 11, wherein the nanoparticles are added for dispersion at a rate less than 3% by weight with respect to the support particles or substrate.

23. The nanostructure according to claim 11, wherein the nanoparticles are added for dispersion at a rate between 0.03 and 2% by weight with respect to the support particles or substrate.

* * * * *